(12) United States Patent
Moriishi

(10) Patent No.: US 10,741,895 B2
(45) Date of Patent: Aug. 11, 2020

(54) LITHIUM AIR BATTERY THAT INCLUDES NONAQUEOUS LITHIUM ION CONDUCTOR

(71) Applicant: Panasonic Intellectual Property Management Co., Ltd., Osaka (JP)

(72) Inventor: Masako Moriishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 16/112,769

(22) Filed: Aug. 27, 2018

(65) Prior Publication Data

US 2019/0097291 A1 Mar. 28, 2019

(30) Foreign Application Priority Data

Sep. 28, 2017 (JP) .................................. 2017-188557
May 16, 2018 (JP) .................................. 2018-094343

(51) Int. Cl.
*H01M 8/22* (2006.01)
*H01M 12/08* (2006.01)
*H01M 12/02* (2006.01)

(52) U.S. Cl.
CPC ........... *H01M 12/08* (2013.01); *H01M 12/02* (2013.01); *H01M 2300/0025* (2013.01); *H01M 2300/0028* (2013.01)

(58) Field of Classification Search
CPC ................. H01M 12/08; H01M 12/02; H01M 2300/0025
See application file for complete search history.

(56) References Cited

U.S. PATENT DOCUMENTS

2016/0344031 A1* 11/2016 Takechi .................. H01M 4/60
2017/0207462 A1* 7/2017 Sun .......................... H01M 4/88

FOREIGN PATENT DOCUMENTS

| JP | 2009-259764 | 11/2009 |
|----|-------------|---------|
| JP | 2010-033890 | 2/2010 |
| JP | 2010-165615 | 7/2010 |
| JP | 2016-219424 | 12/2016 |

OTHER PUBLICATIONS

Benjamin J. Bergner et al., "Understanding the fundamentals of redox mediators in Li-O2 batteries: a case study on nitroxides", Phys. Chem. Chem. Phys., Oct. 26, 2015, 17, 31769-31779.

* cited by examiner

*Primary Examiner* — Raymond Alejandro
(74) *Attorney, Agent, or Firm* — McDermott Will & Emery LLP

(57) ABSTRACT

A lithium air battery includes: a negative electrode configured to occlude and release lithium ions; a positive electrode configured to use oxygen in air as a positive electrode active material; and a nonaqueous lithium ion conductor disposed between the negative electrode and the positive electrode. The nonaqueous lithium ion conductor contains at least one nitroxyl radical compound selected from the group consisting of 9-azanoradamantane-N-oxyl and 9-azabicyclo[3.3.1]nonane-N-oxyl.

10 Claims, 2 Drawing Sheets

LITHIUM AIR BATTERY THAT INCLUDES NONAQUEOUS LITHIUM ION CONDUCTOR

BACKGROUND

1. Technical Field

The present disclosure relates to a lithium air battery that includes a nonaqueous lithium ion conductor.

2. Description of the Related Art

A lithium air battery is a battery in which as a positive electrode active material, oxygen in the air is used, and as a negative electrode active material, a metal or a compound capable of occluding and releasing lithium ions is used. The lithium air battery has advantages in that the energy density is high, the reduction in size can be easily achieved, and the reduction in weight can also be easily achieved. Hence, the lithium air battery has drawn attention as a battery having an energy density higher than that of a lithium ion battery which is currently considered to have the highest energy density.

In the lithium air battery, lithium peroxide is precipitated on a positive electrode by a discharge reaction and is then decomposed by a charge reaction. Since the electron conductivity of lithium peroxide is low, the lithium air battery generally exhibits a high overvoltage during charge. As a result, the charge potential is increased, and the energy efficiency is decreased.

SUMMARY

One non-limiting and exemplary embodiment provides a technique which decreases the charge potential of a lithium air battery and which improves cycle characteristics of the lithium air battery.

In one general aspect, the techniques disclosed here feature a lithium air battery comprising: a negative electrode configured to occlude and release lithium ions; a positive electrode configured to use oxygen in air as a positive electrode active material; and a nonaqueous lithium ion conductor disposed between the negative electrode and the positive electrode. In the lithium air battery described above, the nonaqueous lithium ion conductor contains at least one nitroxyl radical compound selected from the group consisting of 9-azanoradamantane-N-oxyl and 9-azabicyclo[3.3.1]nonane-N-oxyl.

According to an aspect of the present disclosure, the charge potential of the lithium air battery can be decreased, and the cycle characteristics of the lithium air battery can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
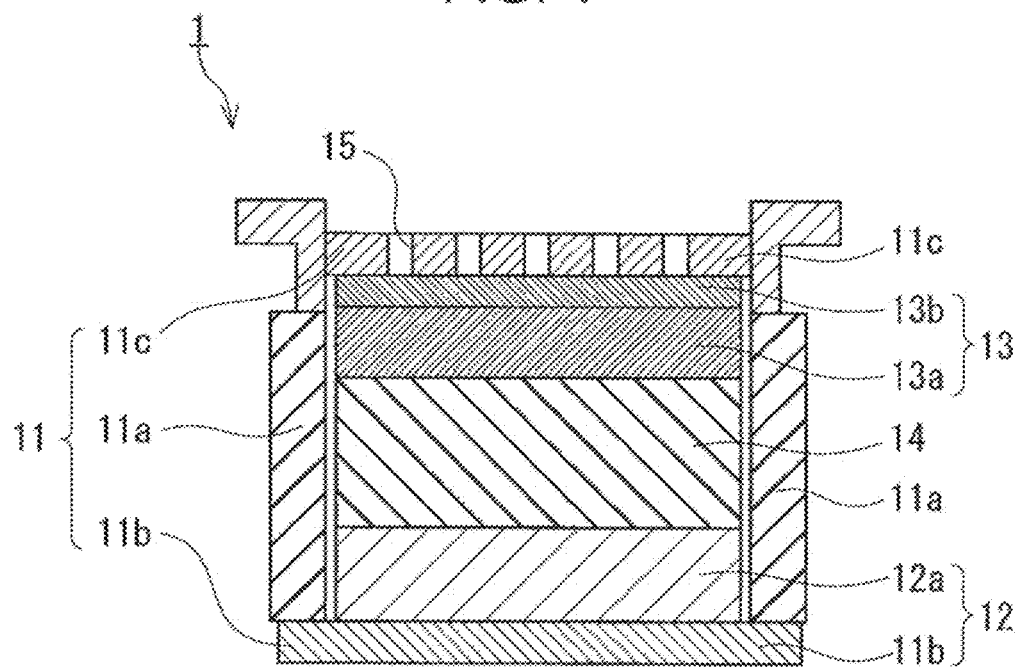
FIG. 1 is a schematic cross-sectional view of a lithium air battery according to one embodiment of the present disclosure.

DETAILED DESCRIPTION (Underlying Knowledge Forming Basis of the Present Disclosure)

Catalysts to produce oxygen disclosed in the following related technical documents are each a compound to be changed into an oxoammonium cation by one-electron oxidation and are each called a nitroxyl radical compound. When oxidative decomposing lithium peroxide, the nitroxyl radical compound is simultaneously reduced. Accordingly, the nitroxyl radical is regenerated. The nitroxyl radical thus regenerated is again changed into a cation body on the surface of a positive electrode and is then allowed to react with lithium peroxide. As described above, while being repeatedly oxidized and reduced, the nitroxyl radical compound decomposes lithium peroxide.

In the lithium air battery disclosed in Japanese Patent Nos. 4816693, 5434086, and 5315831, and "Understanding the fundamentals of redox mediators in Li—$O_2$ batteries: a case study on nitroxides", Phys. Chem. Chem. Phys., 2015, 17, 31769-31779, by Benjamin J. Bergner et al, as a catalyst to produce oxygen which efficiently decomposes lithium peroxide, a derivative of 2,2,6,6-tetramethylpiperidine-1-oxyl (hereinafter, referred to as TEMPO) is used. The TEMPO derivative is contained in an electrolyte liquid or a positive electrode. Since mediating the transfer of electrons between the positive electrode and lithium peroxide, the catalyst to produce oxygen promotes the decomposition of lithium peroxide and decreases the charge potential.

In the lithium air battery disclosed in "Understanding the fundamentals of redox mediators in Li—$O_2$ batteries: a case study on nitroxides", Phys. Chem. Chem. Phys., 2015, 17, 31769-31779, by Benjamin J. Bergner et al, as the catalyst to produce oxygen, a TEMPO derivative, 2-azaadamantane-N-oxyl (AZADO), or 1-methyl-2-azaadamantane-N-oxyl (1-Me-AZADO) is used. Those catalysts to produce oxygen are each dissolved in the electrolyte liquid and decrease the charge potential of the lithium air battery.

However, the influence of the TEMPO derivative on charge/discharge cycle characteristics of a lithium air battery has not been clearly understood.

The present inventor carried out intensive research in order to solve the problem in that the progress of the charge reaction is hindered, and the charge/discharge cycle characteristics are not sufficient. As a result, a lithium air battery according to one aspect of the present disclosure was finally completed.

A lithium air battery according to a first aspect of the present disclosure comprises:

a negative electrode configured to occlude and release lithium ions;

a positive electrode configured to use oxygen in air as a positive electrode active material; and a nonaqueous lithium ion conductor disposed between the negative electrode and the positive electrode, and the nonaqueous lithium ion conductor contains at least one nitroxyl radical compound selected from the group consisting of 9-azanoradamantane-N-oxyl (nor-AZADO) and 9-azabicyclo[3.3.1]nonane-N-oxyl (ABNO).

According to the first aspect, since the nitroxyl radical compound functions as a charging catalyst which efficiently decomposes lithium peroxide, the charge potential is decreased. Besides the promotion of the decomposition of lithium peroxide, since application of a high voltage to each member of the lithium air battery can be avoided, the degradation of each member caused by oxidation can be suppressed, and hence, the cycle characteristics of the lithium air battery are also improved.

In the TEMPO derivative disclosed in the related technical document, since four methyl groups are provided around the NO position (N-oxyl group) which is a redox portion, the radical is sterically protected and is stabilized. If the four methyl groups are each substituted by a hydrogen atom, the TEMPO derivative is rapidly disproportioned, so that a nitrone and a hydroxylamine are generated.

Compared to the TEMPO derivative disclosed in the related technical document, the stability of the radical of each of the nitroxyl radical compounds (nor-AZADO and ABNO) of the present disclosure is high, and in addition, the steric hindrance around the redox portion is also small. By the use of the nitroxyl radical compound having the characteristics as described above as a redox mediator, during charge of the lithium air battery, lithium peroxide can be efficiently decomposed.

When the redox mediator (RM) is oxidized on the surface of the positive electrode, a cation body ($RM^+$) is generated. Even when a reaction between $RM^+$ and lithium peroxide is slow, at an initial charge stage, oxidizable RM is abundantly present around the positive electrode. Hence, the oxidation potential of RM is reflected on the charge potential of the battery, and as a result, the charge potential is decreased. However, in the case described above, a case in which $RM^+$ is merely generated, the charge potential is increased while decomposition of lithium peroxide is not completed, and the charge is finished may occur. In this case, it may be difficult to use the lithium air battery as a secondary battery.

Since having a small steric hindrance around the redox portion and a small molecular diameter as compared to those of each of TEMPO and its derivative, the nitroxyl radical compounds (nor-AZADO and ABNO) of the present disclosure are each likely to be brought into contact with lithium peroxide and each rapidly decompose lithium peroxide. Hence, the nitroxyl radical compounds of the present disclosure not only decrease the charge potential during a charge process but also promote the decomposition of lithium peroxide. As a result, the cycle characteristics of the lithium air battery are improved.

In a second aspect of the present disclosure, for example, the nonaqueous lithium ion conductor of the lithium air battery according to the first aspect may further contain at least one selected from the group consisting of 2,5-di-tert-butyl-1,4-benzoquinone and 2,6-di-tert-butyl-1,4-benzoquinone. According to the second aspect, lithium peroxide can be more efficiently decomposed.

In a third aspect of the present disclosure, for example, concentration of 2,5-di-tert-butyl-1,4-benzoquinone or concentration of 2,6-di-tert-butyl-1,4-benzoquinone in the nonaqueous lithium ion conductor of the lithium air battery according to the second or third aspect may be 0.01 mmol/liter or more. When the concentration of 2,5-di-tert-butyl-1,4-benzoquinone or the concentration of 2,6-di-tert-butyl-1,4-benzoquinone is appropriately controlled, the effects described above can be sufficiently obtained.

In a fourth aspect of the present disclosure, for example, the concentration of 2,5-di-tert-butyl-1,4-benzoquinone or the concentration of 2,6-di-tert-butyl-1,4-benzoquinone in the nonaqueous lithium ion conductor of the lithium air battery according to the second aspect may be 200 mmol/liter or less. When the concentration of 2,5-di-tert-butyl-1,4-benzoquinone or the concentration of 2,6-di-tert-butyl-1,4-benzoquinone is appropriately controlled, the effects described above can be sufficiently obtained.

In a fifth aspect of the present disclosure, for example, the nonaqueous lithium ion conductor of the lithium air battery according to the second aspect contains 2,5-di-tert-butyl-1,4-benzoquinone and 2,6-di-tert-butyl-1,4-benzoquinone, and a concentration of total of 2,5-di-tert-butyl-1,4-benzoquinone and 2,6-di-tert-butyl-1,4-benzoquinone in the nonaqueous lithium ion conductor may be 0.01 mmol/liter or more. When the concentration of total of 2,5-di-tert-butyl-1,4-benzoquinone and 2,6-di-tert-butyl-1,4-benzoquinone is appropriately controlled, the effects described above can be sufficiently obtained.

In a sixth aspect of the present disclosure, for example, the concentration of total of 2,5-di-tert-butyl-1,4-benzoquinone and 2,6-di-tert-butyl-1,4-benzoquinone in the nonaqueous lithium ion conductor of the lithium air battery according to the fifth aspect may be 200 mmol/liter or less. When the concentration of total of 2,5-di-tert-butyl-1,4-benzoquinone and 2,6-di-tert-butyl-1,4-benzoquinone is appropriately controlled, the effects described above can be sufficiently obtained.

In a seventh aspect of the present disclosure, for example, concentration of 9-azanoradamantane-N-oxyl or concentration of 9-azabicyclo[3.3.1]nonane-N-oxyl in the nonaqueous lithium ion conductor of the lithium air battery according to any one of the first to the sixth aspects may be 0.01 mmol/liter or more. According to the seventh aspect, the effect of promoting the decomposition of lithium peroxide and the effect of improving the cycle characteristics of the lithium air battery can be sufficiently obtained.

In an eighth aspect of the present disclosure, for example, the concentration of 9-azanoradamantane-N-oxyl or the concentration of 9-azabicyclo[3.3.1]nonane-N-oxyl in the nonaqueous lithium ion conductor of the lithium air battery according to the seventh aspect may be 200 mmol/liter or less. When the concentration of 9-azanoradamantane-N-oxyl or the concentration of 9-azabicyclo[3.3.1]nonane-N-oxyl is appropriately controlled, the effects described above can be sufficiently obtained.

In a ninth aspect of the present disclosure, for example, the nonaqueous lithium ion conductor of the lithium air battery according to any one of the first to the sixth aspects contains 9-azanoradamantane-N-oxyl and 9-azabicyclo[3.3.1]nonane-N-oxyl, and a concentration of total of 9-azanoradamantane-N-oxyl and 9-azabicyclo[3.3.1]nonane-N-oxyl in the nonaqueous lithium ion conductor may be 0.01 mmol/liter or more. According to the ninth aspect, the effect of promoting the decomposition of lithium peroxide and the effect of improving the cycle characteristics of the lithium air battery can be sufficiently obtained.

In a tenth aspect of the present disclosure, for example, the concentration of total of 9-azanoradamantane-N-oxyl and 9-azabicyclo[3.3.1]nonane-N-oxyl in the nonaqueous lithium ion conductor of the lithium air battery according to the ninth aspect may be 200 mmol/liter or less. When the concentration of total of 9-azanoradamantane-N-oxyl and 9-azabicyclo[3.3.1]nonane-N-oxyl is appropriately controlled, the effects described above can be sufficiently obtained.

In an eleventh aspect of the present disclosure, for example, the nonaqueous lithium ion conductor of the lithium air battery according to any one of the first to the tenth aspects may further contain tetraethylene glycol dimethyl ether. Since being unlikely to evaporate and stable against oxygen radicals, tetraethylene glycol dimethyl ether is suitable for the nonaqueous lithium ion conductor of the lithium air battery.

Hereinafter, an embodiment of the present disclosure will be described with reference to the drawings. The present disclosure is not limited to the following embodiment.

FIG. 1 is a schematic cross-sectional view of a lithium air battery according to one embodiment of the present disclosure. As shown in FIG. 1, a lithium air battery 1 of this embodiment includes a battery case 11, a negative electrode 12, a positive electrode 13, and an electrolyte layer 14 functioning as a nonaqueous lithium ion conductor. The battery case 11 includes a cylindrical portion 11a in which a top surface side and a bottom surface side are opened, a bottom portion 11b provided so as to close the bottom surface-side opening of the cylindrical portion 11a, and a lid portion 11c provided so as to close the top surface-side opening of the cylindrical portion 11a. In the lid portion 11c, air inlet holes 15 introducing air into the battery case 11 are provided. The negative electrode 12 includes a negative electrode layer 12a disposed on an upper surface of the bottom portion 11b of the battery case 11. The bottom portion 11b of the battery case 11 also functions as a negative electrode collector of the negative electrode 12. That is, the bottom portion 11b also functioning as the negative electrode collector and the negative electrode layer 12a collectively form the negative electrode 12. The positive electrode 13 is formed of a positive electrode layer 13a containing a carbon material and a positive electrode collector 13b disposed between the positive electrode layer 13a and the lid portion 11c of the battery case 11. The electrolyte layer 14 of the lithium air battery 1 may include a separator. Besides the bottom portion 11b, a negative electrode collector may also be provided.

A battery reaction in the lithium air battery 1 having the structure as described above is as follows.

Discharge reaction (that is, a reaction while the battery is used)

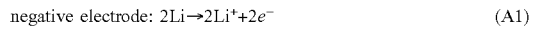

negative electrode: $2Li \rightarrow 2Li^+ + 2e^-$ (A1)

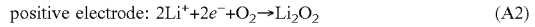

positive electrode: $2Li^+ + 2e^- + O_2 \rightarrow Li_2O_2$ (A2)

Charge reaction (that is, a reaction while the battery is charged)

negative electrode: $2Li^+ + 2e^- \rightarrow 2Li$ (A3)

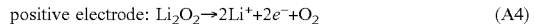

positive electrode: $Li_2O_2 \rightarrow 2Li^+ + 2e^- + O_2$ (A4)

During the discharge, as shown by the formulas (A1) and (A2), electrons and lithium ions are released from the negative electrode 12. When electrons are incorporated into the positive electrode 13, oxygen incorporated from the outside of the battery simultaneously reacts with lithium ions at the positive electrode 13, and lithium peroxide is generated. During the charge, as shown by the formulas (A3) and (A4), electrons and lithium ions are incorporated into the negative electrode 12. From the positive electrode 13, electrons, lithium ions, and oxygen are released. A charging catalyst is a material promoting the reaction shown by the formula (A4).

Next, the individual members of the lithium air battery 1 as described above will be described in detail.

1. Positive Electrode

As described above, the positive electrode 13 includes the positive electrode layer 13a and may further include the positive electrode collector 13b. Hereinafter, the positive electrode layer 13a and the positive electrode collector 13b will be described respectively.

(Positive Electrode Layer)

The positive electrode layer 13a contains a material which enables oxygen in the air to be oxidized and reduced as a positive electrode active material. As the material described above, the positive electrode layer 13a of this embodiment contains an electrically conductive porous material containing carbon. A carbon material to be used as the electrically conductive porous material containing carbon may have a high electron conductivity. In particular, there may be used a carbon material, such as acetylene black or Ketjen black, which is generally used as an electrically conductive auxiliary agent. In view of the specific surface area and the size of primary particles, electrically conductive carbon black, such as Ketjen black, may be used. The carbon material is generally a powder. The specific surface area of the carbon material is, for example, 800 to 2,000 $m^2/g$ and may also be 1,200 to 1,600 $m^2/g$. When the specific surface area of the carbon material is in the range as described above, the positive electrode layer 13a is easily formed to have a fine pore structure. The specific surface area is a value to be measured by a BET method.

The positive electrode layer 13a may further contain a binder fixing the above electrically conductive porous material. As the binder, a material known as the binder for the positive electrode layer 13a of the lithium air battery 1 may be used. As the binder, for example, a poly(vinylidene fluoride) (PVdF) or a polytetrafluoroethylene (PTFE) may be mentioned. The content of the binder in the positive electrode layer 13a is not particularly limited and is, for example, in a range of 1 to 40 percent by mass.

Since being changed in accordance with the application of the lithium air battery 1, the thickness of the positive electrode layer 13a is not particularly limited. The thickness of the positive electrode layer 13a is, for example, in a range of 2 to 500 μm and may also be in a range of 5 to 300 μm.

The positive electrode layer 13a may be formed, for example, by the following method. After a solvent is added to a composition containing a carbon material powder and a charging catalyst powder, mixing thereof is performed. If needed, additives, such as a binder, may also be contained in the composition. The mixture (to be used as a coating liquid) thus obtained is applied on the positive electrode collector 13b by a coating method, such as a doctor blade method, and at least one coating film thus obtained was then dried. Accordingly, the positive electrode 13 is obtained. A sheet-shaped positive electrode layer 13a without provided with the positive electrode collector 13b may be formed in such a way that after the coating film of the mixture is dried, the dried coating film is rolled by a roll press method or the like. The sheet-shaped positive electrode layer 13a may also be directly formed by compression pressing of the composition described above.

(Positive Electrode Collector)

The positive electrode collector 13b is a member collecting electric charges of the positive electrode layer 13a. A material of the positive electrode collector 13b is not particularly limited as long as having an electrical conductivity. As the material of the positive electrode collector 13b, for example, stainless steel, nickel, aluminum, iron, titanium, or carbon may be mentioned. As the shape of the positive electrode collector 13b, for example, a foil shape, a plate shape, or a mesh (such as a grid) shape may be mentioned. Among those mentioned above, in this embodiment, the shape of the positive electrode collector 13b may be a mesh shape. The reason for this is that a mesh-shaped positive electrode collector 13b is excellent in electric charge collection efficiency. In this case, the mesh-shaped positive electrode collector 13b may be disposed in the positive electrode layer 13a. Furthermore, the lithium air battery 1 of this embodiment may further include another positive electrode collector 13b (such as a foil-shaped collector) collecting electric charges collected by the mesh-shaped positive electrode collector 13b. In this embodiment, the battery case 11 which will be described later may also have a function of the positive electrode collector 13b. The thickness of the positive electrode collector 13b is, for example, in a range of 10 to 1,000 µm and may also be in a range of 20 to 400 µm.

2. Negative Electrode

As described above, the negative electrode 12 includes the negative electrode collector and may further include the negative electrode layer 12a. Hereinafter, the negative electrode layer 12a and the negative electrode collector will be described respectively.

(Negative Electrode Layer)

The negative electrode layer 12a of this embodiment may contain a negative electrode active material capable of occluding and releasing lithium ions. As the negative electrode active material described above, a material is not particularly limited as long as containing a lithium element, and for example, there may be mentioned a simple metal (such as metal lithium), an alloy containing a lithium element, an oxide containing a lithium element, or a nitride containing a lithium element. As the alloy containing a lithium element, for example, there may be mentioned a lithium aluminum alloy, a lithium tin alloy, a lithium lead alloy, or a lithium silicon alloy. As the metal oxide containing a lithium element, for example, there may be mentioned a lithium titanium oxide. As the metal nitride containing a lithium element, for example, there may be mentioned a lithium cobalt nitride, a lithium iron nitride, or a lithium manganese nitride.

The negative electrode layer 12a may contain only the negative electrode active material or may also contain a binder besides the negative electrode active material. When the negative electrode active material has a foil shape, the negative electrode layer 12a may contain only the negative electrode active material. When the negative electrode active material is a powder, the negative electrode layer 12a may contain both the negative electrode active material and the binder. As the binder, a material known as the binder for the negative electrode layer 12a of the lithium air battery 1 may be used, and for example, a PVdF or a PTFE may be mentioned. The content of the binder in the negative electrode layer 12a is not particularly limited and may be, for example, in a range of 1 to 40 percent by mass. As a method for forming the negative electrode layer 12a using a powdered negative electrode active material, as is the method for forming the positive electrode layer 13a described above, a formation method, such as a doctor blade method or a compression pressing method, may be used.

(Negative Electrode Collector)

The negative electrode collector is a member collecting electric charges of the negative electrode layer 12a. A material of the negative electrode collector is not particularly limited as long as having an electrical conductivity. A material known as the negative electrode collector of the lithium air battery 1 may be used. As the material of the negative electrode collector, for example, copper, stainless steel, nickel, or carbon may be mentioned. As the shape of the negative electrode collector, for example, there may be mentioned a foil shape, a plate shape, or a mesh (such as a grid) shape. The negative electrode collector may be formed from a porous material having an irregular surface. The battery case 11 which will be described later may also function as the negative electrode collector.

3. Separator

The lithium air battery 1 of this embodiment may include a separator disposed between the positive electrode 13 (or the positive electrode layer 13a) and the negative electrode 12 (or the negative electrode layer 12a). Since the separator is disposed between the positive electrode 13 and the negative electrode 12, a highly safe battery can be obtained. As long as having a function of electrically separating the positive electrode layer 13a from the negative electrode layer 12a, the separator is not particularly limited. As the separator, for example, a porous insulating material may be used, and a porous film, such as a polyethylene (PE) porous film or a polypropylene (PP) porous film; a resin non-woven cloth, such as a PE non-woven cloth or a PP non-woven cloth; a glass fiber non-woven cloth: a paper non-woven cloth, or the like may be mentioned.

The porosity of the separator is, for example, in a range of 30% to 90%. When the porosity is in the range as described above, a sufficient amount of the electrolyte can be held in the separator, and at the same time, the separator has a sufficient strength. The porosity of the separator may also be in a range of 35% to 60%. The porosity can be calculated from the true density, the total volume including pores, and the weight of the material.

4. Electrolyte Layer (Lithium Ion Conductor)

The electrolyte layer 14 is disposed between the positive electrode 13 (or the positive electrode layer 13a) and the negative electrode 12 (or negative electrode layer 12a) and is a layer conducting lithium ions. The electrolyte layer 14 may have any structure as long as having a lithium ion conductivity (i.e., as long as the electrolyte layer 14 functions as a lithium ion conductor) and may have either a solution system structure represented by an organic solvent system containing a lithium salt as the electrolyte or a solid film system structure represented by a high molecular weight solid electrolyte system containing a lithium salt. Regardless of whether the electrolyte is a solid or a gel, the mediator contained in the electrolyte is able to cause an electrochemical reaction on the surface of the positive electrode 13.

When the electrolyte layer 14 is a solution system, a nonaqueous electrolyte liquid prepared by dissolving a lithium salt in a nonaqueous solvent may be used as the electrolyte layer 14.

As the lithium salt contained as the electrolyte in a nonaqueous electrolyte liquid, for example, although lithium perchlorate ($LiClO_4$), lithium hexafluorophosphate ($LiPF_6$), lithium tetrafluoroborate ($LiBF_4$), lithium trifluoromethanesulfonate ($LiCF_3SO_3$), or lithium bistrifluoromethanesulfonylamide ($LiN(CF_3SO_2)_2$) may be mentioned, the lithium salt is not limited thereto. A lithium salt known as the electrolyte of the nonaqueous electrolyte liquid of the lithium air battery 1 may also be used.

The concentration of the electrolyte in the nonaqueous electrolyte liquid is, for example, 0.5 to 2.5 mol/liter. When a solution system electrolyte layer 14 (such as a nonaqueous electrolyte liquid) is used, as described above, the nonaqueous electrolyte liquid is impregnated and held in the separator, so that the electrolyte layer 14 is formed.

As the nonaqueous solvent, nonaqueous solvents known as the nonaqueous solvents of the nonaqueous electrolyte liquid of the lithium air battery 1 may be used. Among those nonaqueous solvents, a chain ether, such as tetraethylene glycol dimethyl ether or tetraethylene glycol diethyl ether, may be used. Compared to a carbonate-based solvent, the chain ether is not likely to cause a side reaction other than the redox reaction of oxygen in the positive electrode 13. In particular, tetraethylene glycol dimethyl ether is not likely to evaporate and is stable against oxygen radicals. As another solvent, dimethylsulfoxide may be mentioned.

The lithium air battery 1 of this embodiment further contains a nitroxyl radical compound as a catalyst to produce oxygen. Note that a catalyst to produce oxygen is for example a redox mediator. As the nitroxyl radical compound, at least one selected from the group consisting of 9-azanoradamantane-N-oxyl (nor-AZADO) represented by the following formula (1) and 9-azabicyclo[3.3.1]nonane-N-oxyl (ABNO) represented by the following formula (2) may be used.

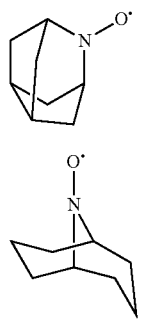

The compound represented by the formula (1) and the compound represented by the formula (2) are each an organic compound having a bridge ring structure including a nitroxyl radical. Since having a robust and symmetric adamantane skeleton with no strain, the compound represented by the formula (1) can be extremely stable as a free radical. Since having a bicycle[3.3.1]nonane skeleton, the compound represented by the formula (2) can also be stable as a free radical. A nitroxyl radical compound having a bicycle[3.3.1]nonane skeleton is one analog of a nitroxyl radical compound having an adamantane skeleton.

In this embodiment, the nitroxyl radical compound is contained in the electrolyte layer 14 which is the nonaqueous lithium ion conductor. When the lithium air battery 1 is charged, the nitroxyl radical compound is changed into a cation body by oxidation on the surface of the positive electrode 13. This cation body functions as a charging catalyst promoting the decomposition of lithium peroxide.

When a nonaqueous electrolyte liquid is used as the electrolyte layer 14, the nitroxyl radical compound is dissolved in a nonaqueous solvent forming the nonaqueous electrolyte liquid. Hence, the nitroxyl radical compound can be abundantly present around the positive electrode 13. The concentration of the nitroxyl radical compound in the nonaqueous electrolyte liquid is, for example, 0.01 mmol/liter or more. The upper limit of the concentration of the nitroxyl radical compound in the nonaqueous electrolyte liquid is, for example, 200 mmol/liter. When the concentration of the nitroxyl radical compound is appropriately controlled, the effects described above can be sufficiently obtained.

The lithium air battery 1 of this embodiment further contains an n-type redox molecule mediating the transfer of electrons in a discharge reaction. As the n-type redox molecule, at least one selected from the group consisting of 2,5-di-tert-butyl-1,4-benzoquinone represented by the following formula (3) and 2,6-di-tert-butyl-1,4-benzoquinone represented by the following formula (4) may be used.

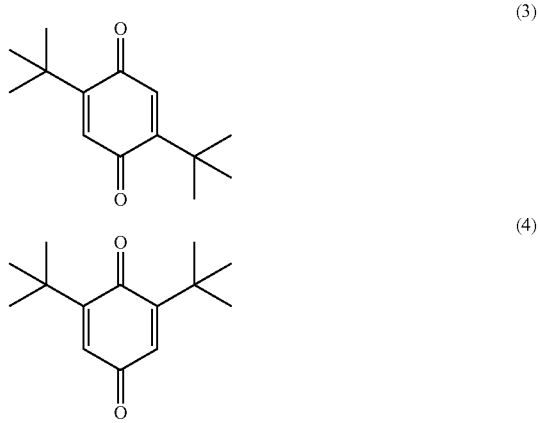

In addition, 2,5-di-tert-butyl-1,4-benzoquinone and 2,6-di-tert-butyl-1,4-benzoquinone (each of which is called DBBQ) are n-type redox molecules having a redox potential of approximately 2.6 V (vs. Li/Li$^+$) and having redox characteristics similar to each other and are each transformed into an anion body (DBBQ$^-$) upon reception of an electron from the positive electrode 13 during discharge. DBBQ$^-$ is stabilized by forming a complex (LiDBBQO$_2$) with Li$^+$ and O$_2$. It is believed that two molecules of this complex are then disproportioned, and as a result, lithium peroxide is generated.

Since DBBQ mediates the transfer of electrons, lithium peroxide can be generated not only on the surface of the positive electrode 13 but also in the electrolyte liquid (in the vicinity of the positive electrode 13) slightly apart from the surface of the positive electrode 13. That is, DBBQ which receives an electron from the positive electrode 13 diffuses in the electrolyte liquid by the concentration gradient, and as a result, a reaction field in which lithium peroxide is generated is increased. Hence, lithium peroxide is generated in such a way that many particles generated at different positions are deposited on the surface of the positive electrode 13. When DBBQ is not used, since the transfer of electrons is performed only on the surface of the positive electrode 13, lithium peroxide is generated so as to cover the surface of the positive electrode 13. If the discharge capacity is assumed to be equal between the case in which DBBQ is used and the case in which no DBBQ is used, in the case in which DBBQ is used, the surface area of lithium peroxide at the positive electrode 13 is large as compared to that in the case in which DBBQ is not used. As a result, since the reaction area between lithium peroxide and the cation body of the redox mediator functioning as the catalyst to produce oxygen is increased during the charge, the catalyst effect to be obtained is enhanced, and as a result, lithium peroxide can be efficiently decomposed.

When a nonaqueous electrolyte liquid is used as the electrolyte layer 14, DBBQ is dissolved in a nonaqueous solvent forming the nonaqueous electrolyte liquid. Hence, DBBQ can be abundantly present around the positive electrode 13. The concentration of DBBQ in the nonaqueous electrolyte liquid is, for example, 0.01 mmol/liter or more. The upper limit of the concentration of DBBQ in the nonaqueous electrolyte liquid is, for example, 200 mmol/liter. When the concentration of DBBQ is appropriately controlled, the effects described above can be sufficiently obtained. When 2,5-di-tert-butyl-1,4-benzoquinone and 2,6-di-tert-butyl-1,4-benzoquinone are both contained in the nonaqueous electrolyte liquid as DBBQ, the total of their concentrations is the concentration of DBBQ.

5. Battery Case

As long as capable of receiving the positive electrode 13, the negative electrode 12, and the electrolyte layer 14 as described above, the battery case 11 of the lithium air battery 1 of this embodiment may have any shape. The shape of the battery case 11 of the lithium air battery 1 of this embodiment is not limited to the shape shown in FIG. 1, and various battery cases 11, such as a coin type, a flat plate type, a cylindrical type, and a laminate type, may be used. The battery case 11 may be either an air-open type battery case or an airtight type battery case. The air-open type battery case has an airflow hole through which the air is charged and discharged and is a case in which the air is contactable with the positive electrode. When the airtight type battery case is used, a supply pipe and an exhaust pipe of a gas (such as air) may be provided for the airtight type battery case. In this case, the gas to be supplied and exhausted may be dry air. In addition, the gas to be supplied and exhausted may have a high oxygen concentration or may be pure oxygen (e.g., oxygen concentration: 99.99%). The oxygen concentration may be high during discharge and may be low during charge.

EXAMPLES

Hereinafter, the present disclosure will be described in more detail with reference to examples. However, the following examples will be described by way of example, and the present disclosure is not limited thereto.

Example 1

As a carbon material, a powder of Ketjen black (manufactured by Lion Corporation) was used. As a binder, powdered PTFE (manufactured by Daikin Industries, Ltd.) was used. The carbon material and the binder were kneaded together at a mass ratio of 90:10 using an ethanol solvent, so that a mixture was obtained. The mixture was rolled using a roll press machine, so that an electrode sheet was formed. The electrode sheet thus obtained was cut, so that a positive electrode (positive electrode layer) was obtained.

LiTFSA (lithium bistrifluoromethanesulfonylamide, manufactured by Kishida Chemical Co., Ltd.) was mixed with and dissolved in tetraethylene glycol dimethyl ether (TEGDME, manufactured by Kishida Chemical Co., Ltd.) to have a concentration of 1 mol/liter. The mixed solution thus obtained was stirred for 24 hours in a dry air atmosphere at a dew point of −50° C. or less, so that a nonaqueous electrolyte liquid was obtained. In the nonaqueous electrolyte liquid thus obtained, nor-AZADO was dissolved to have a concentration of 20 mmol/liter.

As a separator, a glass fiber separator was prepared. A SUS304 mesh was adhered to metal lithium foil as a collector, so that a negative electrode was obtained. By the use of the positive electrode, the separator, the nonaqueous electrolyte liquid, and the negative electrode, a lithium air battery having the structure shown in FIG. 1 was formed.

Example 2

Except for that ABNO was used instead of using nor-AZADO, a lithium air battery of Example 2 was formed by the same method as that of Example 1.

Comparative Example 1

Except for that the nitroxyl radical compound was not used, a lithium air battery of Comparative Example 1 was formed by the same method as that of Example 1.

Comparative Example 2

Except for that TEMPO was used instead of using nor-AZADO, a lithium air battery of Comparative Example 2 was formed by the same method as that of Example 1.

(Charge/Discharge Test)

Figure 2:
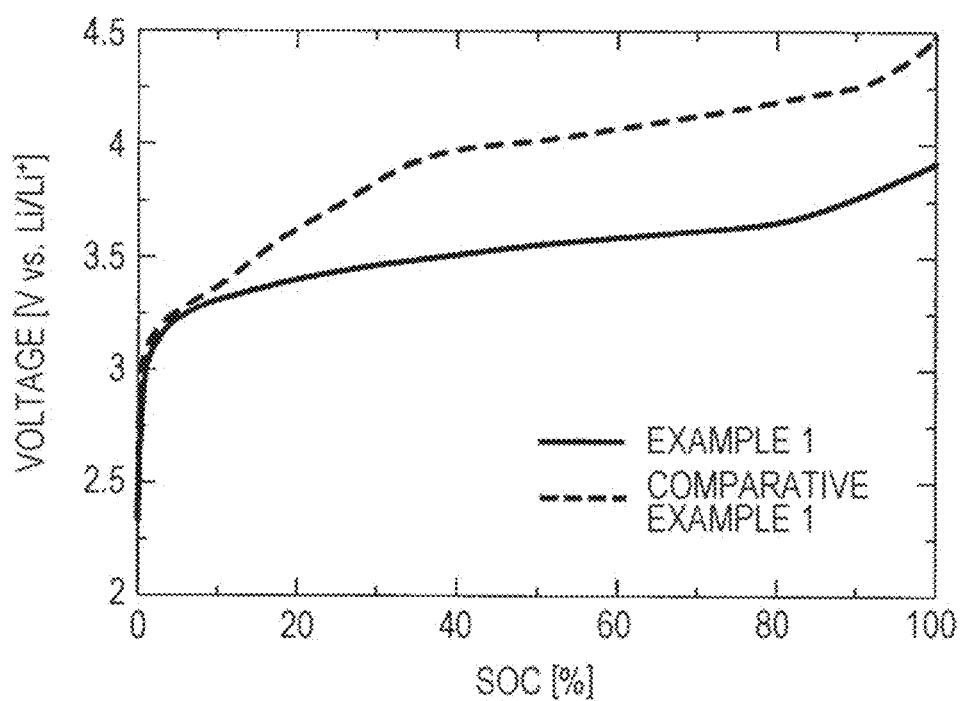
FIG. 2 is a graph showing the charge curve of a lithium air battery of each of Example 1 and Comparative Example 1.
Figure 3:
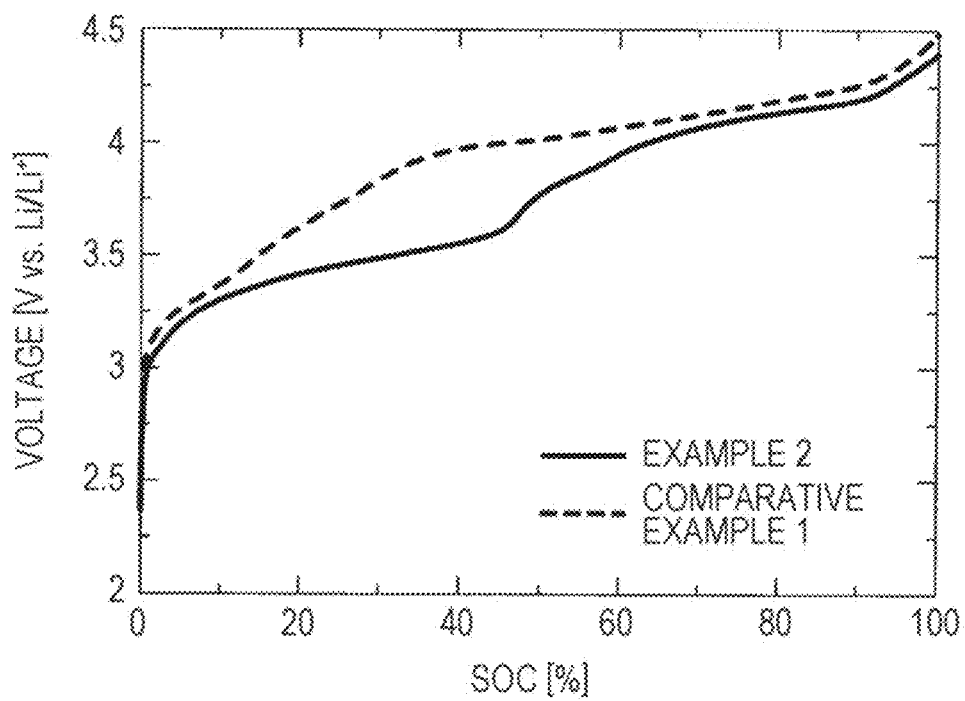
FIG. 3 is a graph showing the charge curve of a lithium air battery of each of Example 2 and Comparative Example 1.
Figure 4:
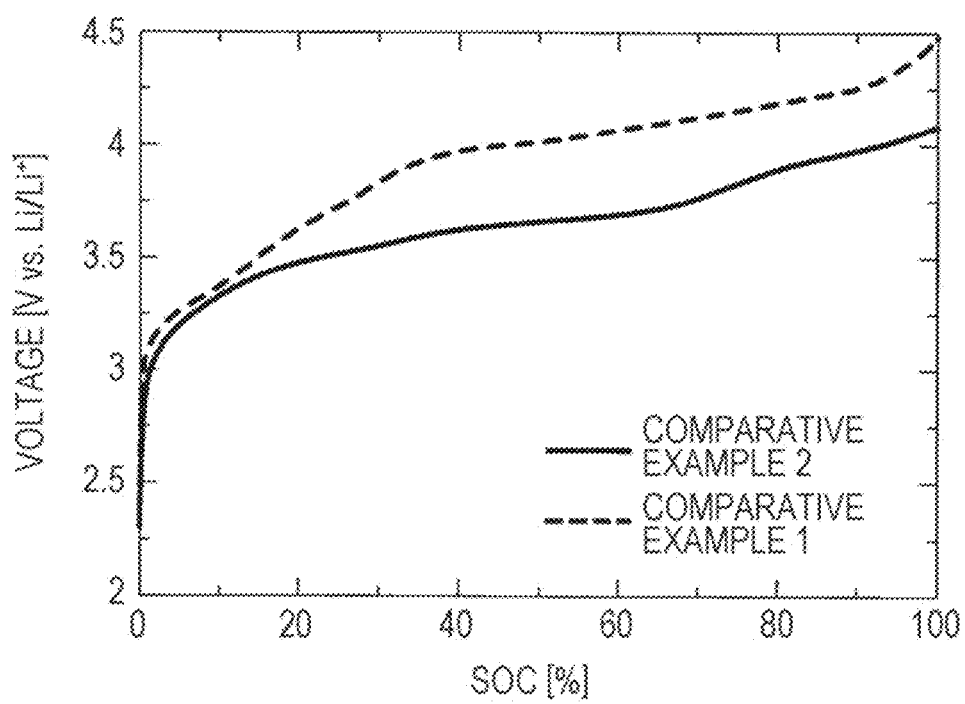
FIG. 4 is a graph showing the charge curve of a lithium air battery of each of Comparative Examples 1 and 2.

After the lithium air battery of each of Examples and Comparative Examples was held for 20 minutes or more in an oxygen atmosphere, a charge/discharge test was performed. The current density during the discharge was 0.4 mA/cm$^2$, and the cutoff voltage was 2.0 V. The current density during the charge was 0.1 mA/cm$^2$, and the cutoff voltage was 4.5 V. After the discharge was performed, the charge was performed. The charge curves thus obtained are shown in FIGS. 2 to 4. FIG. 2 is a graph showing the charge curve of the lithium air battery of each of Example 1 and Comparative Example 1. FIG. 3 is a graph showing the charge curve of the lithium air battery of each of Example 2 and Comparative Example 1. FIG. 4 is a graph showing the charge curve of the lithium air battery of each of Comparative Examples 1 and 2. SOC (State of Charge) along the horizontal axis of each of FIGS. 2 to 4 represents the charging rate, and the voltage along the vertical axis represents the battery voltage with respect to the redox potential of negative electrode lithium.

As shown in FIGS. 2 to 4, the charge potential of the lithium air battery of each of Examples 1 and 2 and Comparative Example 2 was lower than the charge potential of the lithium air battery of Comparative Example 1. The reason for this is estimated that in Examples 1 and 2 and Comparative Example 2, since being changed into a cation body by oxidation on the surface of the positive electrode, the nitroxyl radical compound functions as a charging catalyst which efficiently decomposes lithium peroxide, and as a result, the charge potential is decreased.

(Charge/Discharge Cycle Test)

Under the same conditions as those for the charge/discharge test described above, a charge/discharge cycle test of the lithium air battery of each of Examples and Comparative Examples was performed. In particular, the discharge and the charge were each repeatedly performed 5 times. The results of this charge/discharge cycle test are shown in Table 1. The charge/discharge efficiency is represented by the rate of the discharge capacity of each cycle with respect to the discharge capacity of the first cycle.

TABLE 1

| CHARGE/DISCHARGE EFFICIENCY (%) | EXAMPLE 1 | EXAMPLE 2 | COMPARATIVE EXAMPLE 1 | COMPARATIVE EXAMPLE 2 |
|---|---|---|---|---|
| 1$^{ST}$ CYCLE | 100 | 100 | 100 | 100 |
| 3$^{RD}$ CYCLE | 66 | 67 | 58 | 23 |
| 5$^{TH}$ CYCLE | 67 | 34 | 27 | 8 |

As shown in Table 1, compared to the lithium air battery of each of Comparative Examples 1 and 2, the discharge capacity of the lithium air battery of each of Examples 1 and 2 was not likely to decrease. In the lithium air battery of Example 1, as the catalyst to produce oxygen (redox mediator), nor-AZADO was used. In the lithium air battery of Example 2, as the catalyst to produce oxygen, ABNO was used. The steric hindrance around the redox portion of each of those nitroxyl radical compounds is small, and the molecular diameters thereof are each also small. Hence, it is estimated that the above nitroxyl radical compounds each function as a charging catalyst which efficiently decomposes lithium peroxide. In addition, the nitroxyl radical compounds described above are each likely to be brought into contact with lithium peroxide, so that lithium peroxide is rapidly decomposed. Hence, in Examples 1 and 2, it is believed that since the nitroxyl radical compound not only decreases the charge potential during the charge process but also promotes the decomposition of lithium peroxide, the cycle characteristics of the lithium air battery are improved.

In the lithium air battery (FIG. 4) of Comparative Example 2, the effect of decreasing the charge potential by the redox mediator was also obtained. However, as apparent from the results shown in Table 1, the effect of promoting the decomposition of lithium peroxide by TEMPO, which was the redox mediator used in the lithium air battery of Comparative Example 2, was low. The reason for this is estimated that since lithium peroxide remained in the positive electrode after the completion of the charge operation, the effect of improving the cycle characteristics could not be obtained.

Example 3

Except for that DBBQ (2,5-di-tert-butyl-1,4-benzoquinone) was additionally dissolved in the nonaqueous electrolyte liquid at a concentration of 10 mmol/liter, a lithium air battery of Example 3 was formed by the same method as that of Example 1.

Example 4

A lithium air battery of Example 4 was formed by the same method as that of Example 1. The lithium air battery of Example 4 was the same as the lithium air battery of Example 1.

Example 5

Except for that ABNO was used instead of using nor-AZADO, and DBBQ (2,5-di-tert-butyl-1,4-benzoquinone) was additionally dissolved in the nonaqueous electrolyte liquid at a concentration of 10 mmol/liter, a lithium air battery of Example 5 was formed by the same method as that of Example 1.

Example 6

Except for that ABNO was used instead of using nor-AZADO, a lithium air battery of Example 6 was formed by the same method as that of Example 1. The lithium air battery of Example 6 was the same as the lithium air battery of Example 2.

Comparative Example 3

Except for that as the catalyst, DBBQ (2,5-di-tert-butyl-1,4-benzoquinone) was only used, a lithium air battery of Comparative Example 3 was formed by the same method as that of Example 1.

Comparative Example 4

Except for that the catalyst was not used, a lithium air battery of Comparative Example 4 was formed by the same method as that of Example 1. The lithium air battery of Comparative Example 4 was the same as the lithium air battery of Comparative Example 1.

(Charge/Discharge Test)

After the lithium air battery of each of Examples 3 to 6 and Comparative Examples 3 and 4 was held for 20 minutes or more in an oxygen atmosphere, a charge/discharge test was performed. The current density during the discharge was 0.4 mA/cm$^2$, and the cutoff voltage was 2.0 V. The current density during the charge was 0.1 mA/cm$^2$, and the cutoff voltage was 3.9 V. After the discharge was performed, the charge was performed. The charge/discharge efficiency is shown in Table 2.

TABLE 2

| | CATALYST | CHARGE/DISCHARGE EFFICIENCY (%) |
|---|---|---|
| EXAMPLE 3 | nor-AZADO + DBBQ | 100 |
| EXAMPLE 4 | nor-AZADO | 99 |
| EXAMPLE 5 | ABNO + DBBQ | 82 |
| EXAMPLE 6 | ABNO | 58 |
| COMPARATIVE EXAMPLE 3 | DBBQ | 45 |
| COMPARATIVE EXAMPLE 4 | NO | 33 |

As shown in Table 2, compared to the lithium air battery of each of Comparative Examples 3 and 4, the charge/discharge efficiency of the lithium air battery of each of Examples 3 to 6 was high.

As apparent from the comparison between Examples 3 and 4 and the comparison between Examples 5 and 6, when DBBQ was added to the nonaqueous electrolyte liquid, the charge/discharge efficiency was further improved. The reason for this is believed that since DBBQ was contained in the nonaqueous electrolyte liquid, the surface area of lithium peroxide generated during the discharge was increased, lithium peroxide was likely to be decomposed during the charge, and as a result, the charge/discharge efficiency was improved. In particular, in the lithium air battery of each of Examples 3 and 5, since DBBQ and the highly active catalyst to produce oxygen were used in combination, an extremely high charge/discharge efficiency could be obtained.

As described above, according to the technique of the present disclosure, the decomposition of lithium peroxide, which is a discharge product, is promoted, the charge potential of the lithium air battery is decreased, and the cycle characteristics of the lithium air battery can be improved.

According to the technique of the present disclosure, while a high capacity is secured, the charge potential of the lithium air battery can be decreased, so that a lithium air battery having preferable charge/discharge cycle characteristics can be provided. Accordingly, the lithium air battery of the present disclosure is useful, for example, as a secondary battery.

What is claimed is:

1. A lithium air battery comprising:
   a negative electrode configured to occlude and release lithium ions;
   a positive electrode configured to use oxygen in air as a positive electrode active material; and
   a nonaqueous lithium ion conductor disposed between the negative electrode and the positive electrode,
   wherein the nonaqueous lithium ion conductor contains at least one nitroxyl radical compound selected from the group consisting of 9-azanoradamantane-N-oxyl and 9-azabicyclo[3.3.1]nonane-N-oxyl, and
   the nonaqueous lithium ion conductor further contains at least one selected from the group consisting of 2,5-di-tert-butyl-1,4-benzoquinone and 2,6-di-tert-butyl-1,4-benzoquinone.

2. The lithium air battery according to claim 1,
   wherein the nonaqueous lithium ion conductor contains either 2,5-di-tert-butyl-1,4-benzoquinone or 2,6-di-tert-butyl-1,4-benzoquinone, and
   wherein concentration of 2,5-di-tert-butyl-1,4-benzoquinone or concentration of 2,6-di-tert-butyl-1,4-benzoquinone in the nonaqueous lithium ion conductor is 0.01 mmol/liter or more.

3. The lithium air battery according to claim 2,
   wherein the concentration of 2,5-di-tert-butyl-1,4-benzoquinone or the concentration of 2,6-di-tert-butyl-1,4-benzoquinone in the nonaqueous lithium ion conductor is 200 mmol/liter or less.

4. The lithium air battery according to claim 1,
   wherein the nonaqueous lithium ion conductor contains 2,5-di-tert-butyl-1,4-benzoquinone and 2,6-di-tert-butyl-1,4-benzoquinone, and
   a concentration of total of 2,5-di-tert-butyl-1,4-benzoquinone and 2,6-di-tert-butyl-1,4-benzoquinone in the nonaqueous lithium ion conductor is 0.01 mmol/liter or more.

5. The lithium air battery according to claim 4,
   wherein the concentration of total of 2,5-di-tert-butyl-1,4-benzoquinone and 2,6-di-tert-butyl-1,4-benzoquinone in the nonaqueous lithium ion conductor is 200 mmol/liter or less.

6. The lithium air battery according to claim 1,
   wherein the nonaqueous lithium ion conductor contains either 9-azanoradamantane-N-oxyl or 9-azabicyclo[3.3.1]nonane-N-oxyl, and
   wherein concentration of 9-azanoradamantane-N-oxyl or concentration of 9-azabicyclo[3.3.1]nonane-N-oxyl in the nonaqueous lithium ion conductor is 0.01 mmol/liter or more.

7. The lithium air battery according to claim 6,
   wherein the concentration of 9-azanoradamantane-N-oxyl or the concentration of 9-azabicyclo[3.3.1]nonane-N-oxyl in the nonaqueous lithium ion conductor is 200 mmol/liter or less.

8. The lithium air battery according to claim 1,
   wherein the nonaqueous lithium ion conductor contains 9-azanoradamantane-N-oxyl and 9-azabicyclo[3.3.1]nonane-N-oxyl, and
   a concentration of total of 9-azanoradamantane-N-oxyl and 9-azabicyclo[3.3.1]nonane-N-oxyl in the nonaqueous lithium ion conductor is 0.01 mmol/liter or more.

9. The lithium air battery according to claim 8,
   wherein the concentration of total of 9-azanoradamantane-N-oxyl and 9-azabicyclo[3.3.1]nonane-N-oxyl in the nonaqueous lithium ion conductor is 200 mmol/liter or less.

10. The lithium air battery according to claim 1,
    wherein the nonaqueous lithium ion conductor further contains tetraethylene glycol dimethyl ether.

* * * * *